US011531370B2

(12) United States Patent
Liao

(10) Patent No.: US 11,531,370 B2
(45) Date of Patent: Dec. 20, 2022

(54) TOOL INSERTION STRUCTURE AND ELECTRONIC DEVICE

(71) Applicant: Qisda Corporation, Taoyuan (TW)

(72) Inventor: Han-Hsiang Liao, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 148 days.

(21) Appl. No.: 17/019,477

(22) Filed: Sep. 14, 2020

(65) Prior Publication Data

US 2021/0080997 A1    Mar. 18, 2021

(30) Foreign Application Priority Data

Sep. 17, 2019  (CN) .......................... 201910876056.6

(51) Int. Cl.
| | |
|---|---|
| G06F 3/033 | (2013.01) |
| G06F 1/16 | (2006.01) |
| G06F 3/038 | (2013.01) |
| G06F 3/039 | (2013.01) |

(52) U.S. Cl.
CPC ............ *G06F 1/1607* (2013.01); *G06F 3/033* (2013.01); *G06F 3/038* (2013.01); *G06F 3/039* (2013.01)

(58) Field of Classification Search
None
See application file for complete search history.

(56) References Cited

U.S. PATENT DOCUMENTS

| 10,236,710 | B1 * | 3/2019 | de la Fuente | ....... G06F 3/03545 |
|---|---|---|---|---|
| 2014/0029183 | A1 * | 1/2014 | Ashcraft | ............... G06F 3/0393 |
| | | | | 361/679.02 |
| 2016/0150945 | A1 * | 6/2016 | Okamoto | ........... A61B 1/00148 |
| | | | | 600/114 |
| 2017/0097698 | A1 * | 4/2017 | Maeshima | .......... G06F 3/03545 |
| 2020/0103986 | A1 * | 4/2020 | de la Fuente | ....... G06F 3/03545 |

* cited by examiner

*Primary Examiner* — Xuyang Xia

(57) ABSTRACT

A tool insertion structure and an electronic device are provided. The tool insertion structure includes a base, a body and an elastic element. The body includes a sleeve portion having an insertion space for a tool. The body is movable between a first position and a second position and relative to the base. The elastic element is connected to the base and the body to provide a force for moving the body from the second position to the first position. The size of the insertion space varies as the body moves between the first position and the second position.

15 Claims, 4 Drawing Sheets

TOOL INSERTION STRUCTURE AND ELECTRONIC DEVICE

This application claims the benefit of People's Republic of China Application No. 201910876056.6, filed Sep. 17, 2019, the disclosure of which is incorporated by reference herein in its entirety.

BACKGROUND OF THE INVENTION

Field of the Invention

The invention relates in general to a tool insertion structure and an electronic device, and more particularly to a tool insertion structure and an electronic device adaptable to different sizes of tools.

Description of the Related Art

Some tools, when idled, may be received and inserted into a tool insertion structure. However, conventional tool insertion structures normally may receive a fixed size of tools. To receive different sizes of tools, the user needs to purchase an extra tool insertion structure, which is very troublesome and inconvenient.

SUMMARY OF THE INVENTION

The invention is directed to a tool insertion structure and an electronic device adaptable to various sizes of tools.

According to one embodiment of the present invention, a tool insertion structure adaptable to different sizes of tools is provided. The tool insertion structure includes a base, a body and an elastic element. The body includes a sleeve portion having an insertion space for a tool. The body is movable between a first position and a second position and relative to the base. The elastic element is connected to the base and the body to provide a force for moving the body from the second position to the first position. The size of the insertion space varies as the body moves between the first position and the second position.

According to another embodiment of the present invention, an electronic device is provided. The electronic device includes a casing, a body and an elastic element. The casing having an opening is configured to cover a touch panel. The body includes a sleeve portion movably disposed in the opening. The sleeve portion has an insertion space for a stylus pen. The body is movable between a first position and a second position and relative to the casing. The elastic element is connected to the casing and the body to provide a force for moving the body from the second position to the first position. The size of the insertion space varies as the body moves between the first position and the second position.

The above and other aspects of the invention will become better understood with regard to the following detailed description of the preferred but non-limiting embodiment(s). The following description is made with reference to the accompanying drawings.

DETAILED DESCRIPTION OF THE INVENTION

A number of embodiments of the invention are disclosed below with accompanying drawings. For the invention to be understood clearly, many details of practices are explained in the following disclosure. However, it should be understood that the details of practices are not for limiting the invention. That is, in some embodiments of the invention, the details of practices are not necessary. To simplify the drawings, some generally known structures and elements are schematically illustrated. Unless otherwise specified, element designations common to different drawings may be regarded as corresponding elements. These drawings are for describing the connection relationship between the elements of the embodiments, and the dimension scales used in the accompanying drawings are not based on actual proportion of the elements.

Figure 1:
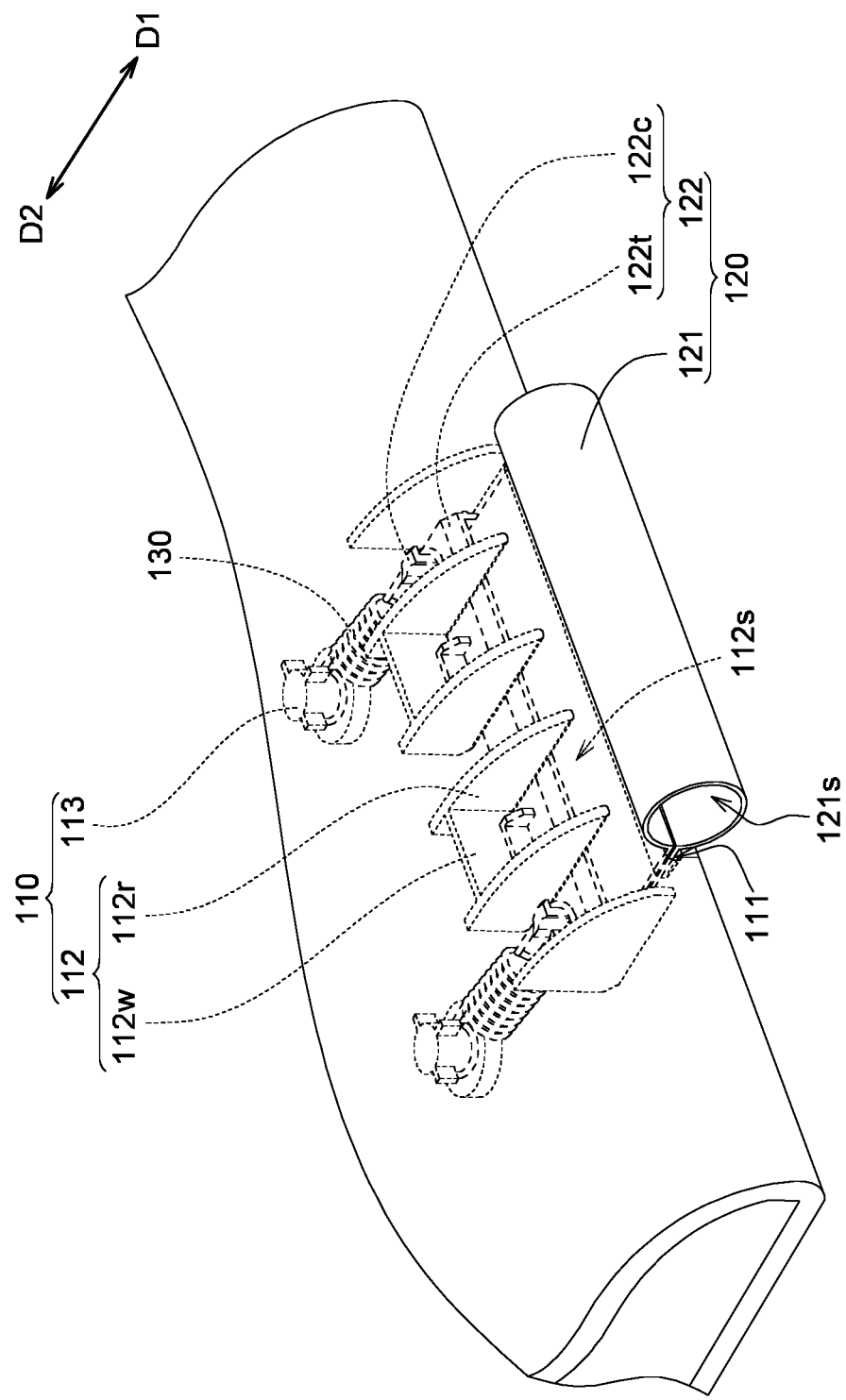
FIG. 1 is a 3D diagram of a tool insertion structure at a first state according to an embodiment of the invention.
Figure 2:
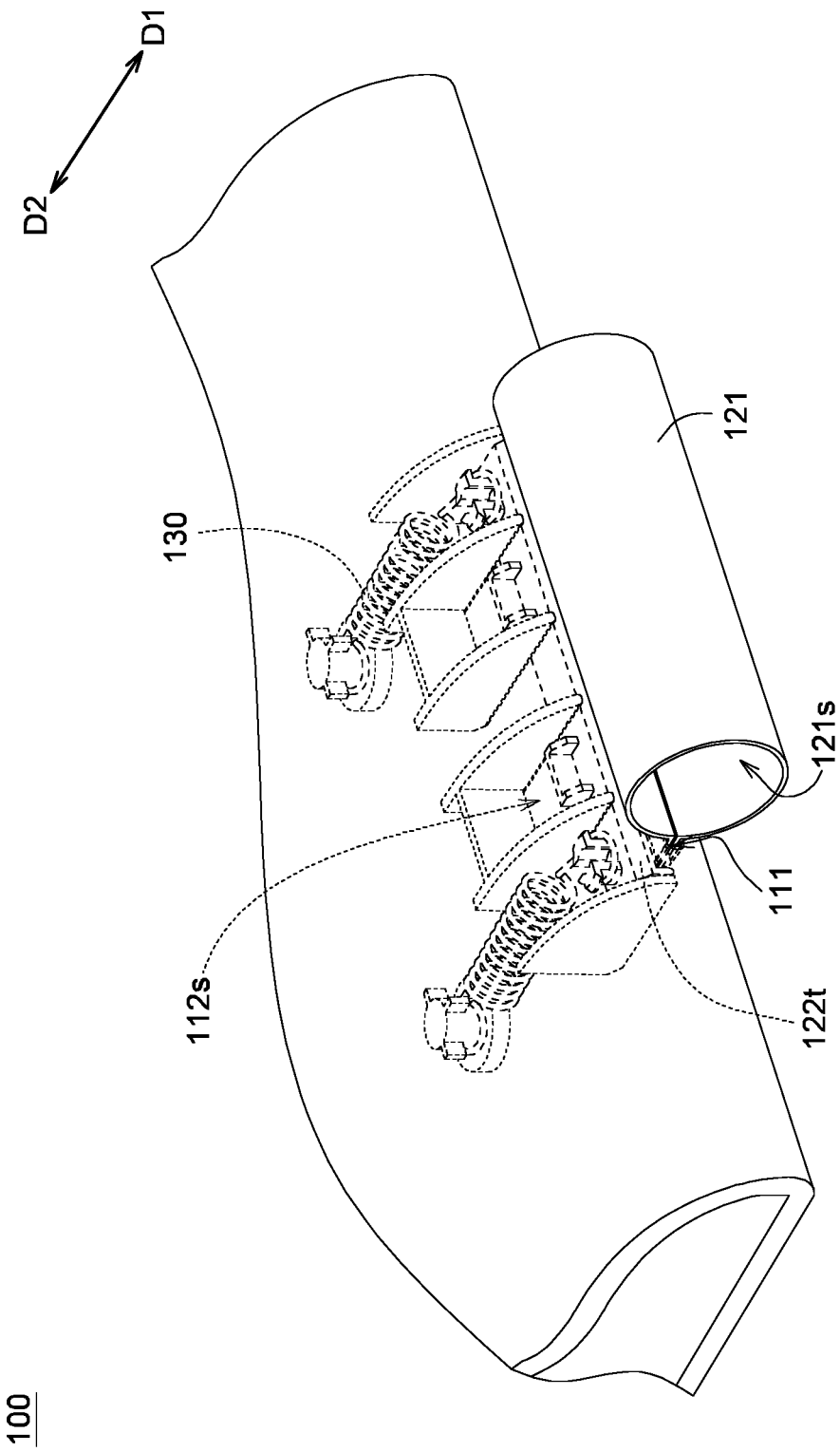
FIG. 2 is a 3D diagram of the tool insertion structure of FIG. 1 at a second state.

FIG. 1 is a 3D diagram of a tool insertion structure 100 at a first state according to an embodiment of the invention. FIG. 2 is a 3D diagram of the tool insertion structure 100 of FIG. 1 at a second state.

The tool insertion structure 100 may receive different sizes of tools. Specifically, the tool insertion structure 100 at a first state, at a second state, and at a transition state between the first state and the second state respectively may receive different sizes of tools. The tools include but are not limited to different shapes and sizes of stationery, stylus pens, kitchen tools, and hand tools, and the invention does not restrict the type of the tool.

Referring to FIG. 1, the tool insertion structure 100 may include a base 110, the body 120 and the elastic element 130. The body 120, which may move relative to the base 110, includes a sleeve portion 121 formed of a material with elasticity or flexibility. In an embodiment, the material of the sleeve portion 121 includes but is not limited to nylon soft cloth.

The sleeve portion 121 has an insertion space 121s for a tool. Refer to FIG. 1 and FIG. 2. In FIG. 1, the body 120 is at a first position. In FIG. 2, the body 120 is at a second position. As the body 120 moves between the first position and the second position, the size of the insertion space 121s varies. For example, when the body 120 is at the first position, the size of the insertion space 121s is the minimum; when the body 120 is at the second position, the size of the insertion space 121s is the maximum. Thus, the size of the insertion space 121s may be adjusted according to the size of the tool to receive different sizes of tools.

Furthermore, the body 120 is movable between a first position and a second position and relative to the base 110 the elastic element 130. The elastic element 130 is connected to the base 110 and the body 120 to provide a force for moving the body 120 from the second position to the first position. In an embodiment, the elastic element 130 may be realized by such as a tension spring, but is not limited thereto. When the body 120 is moved from the first position as indicated in FIG. 1 to the second position as indicated in FIG. 2 by a force, the elastic element 130 gradually stores an elastic force. When the force is not more applied to the body 120, the elastic force stored in the elastic element 130 may restore the body 120 to the first position as indicated in FIG. 1.

In the drawings of the present embodiment, two elastic elements 130 are illustrated, but the quantity of elastic elements is not limited thereto. In other embodiments, the quantity of the elastic element 130 may be one or many, and any quantity would do as long as the elastic force provided by the elastic element 130 may restore the body 120 from the second position to the first position.

Refer to FIG. 1 and FIG. 2. The base 110 has an opening 111. The sleeve portion 121 is movably disposed in the opening 111. Specifically, the sleeve portion 121 may pass through the opening 111 to move along a first direction D1 and a second direction D1 opposite to the first direction D1. The sleeve portion 121 is partly inside the base 110, and the portion of the sleeve portion 121 outside the base 110 through the opening 111 defines an insertion space 121s.

Figure 3:
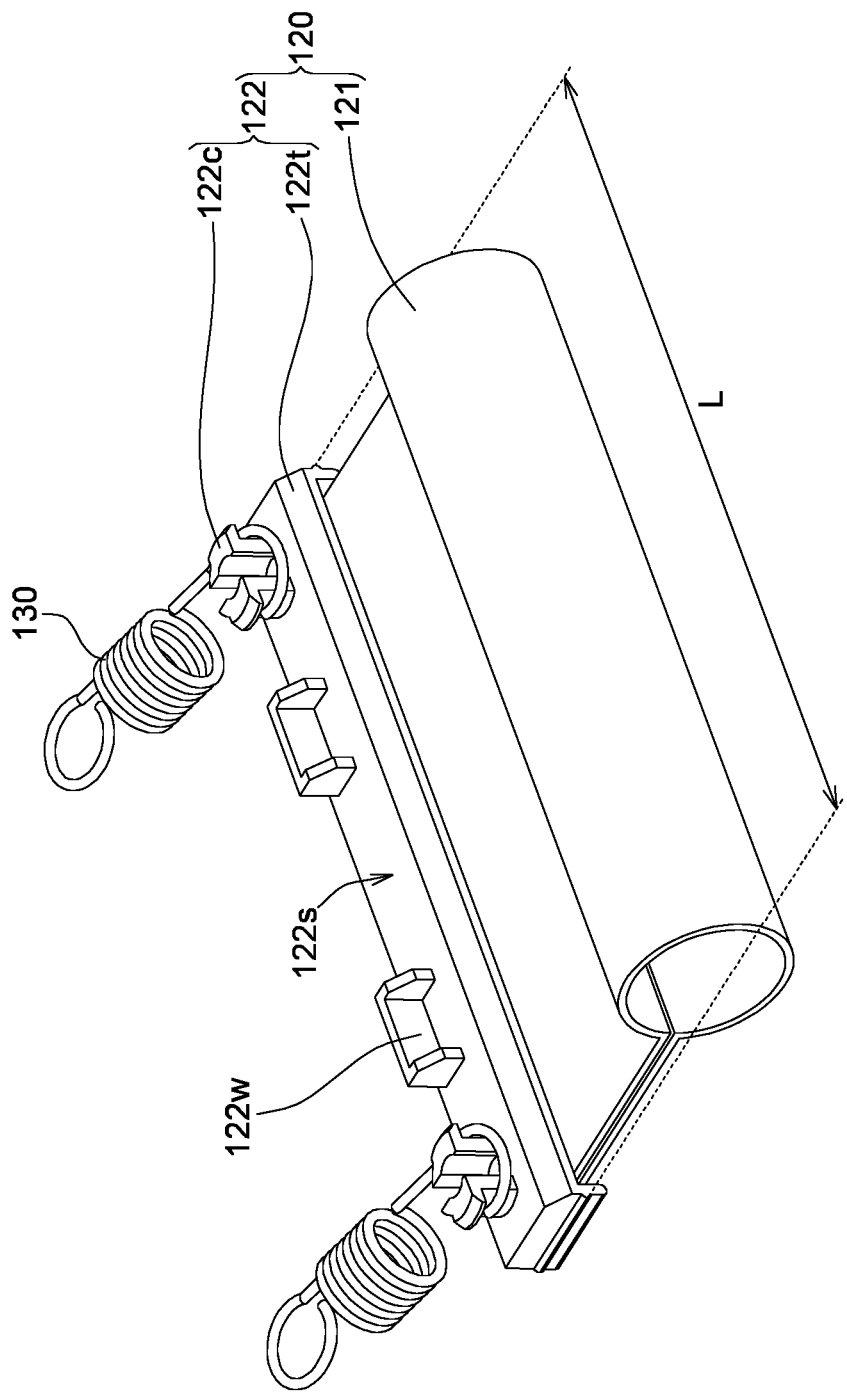
FIG. 3 is a 3D diagram of the tool insertion structure of FIG. 1 omitting the base.

FIG. 3 is a 3D diagram of the tool insertion structure 100 of FIG. 1 omitting the base 110 to more clearly illustrate the structure of the body 120 and the elastic element 130.

Referring to FIG. 3, the body 120 may further include a connection member 122 on which the sleeve portion 121 is fixed. In an embodiment, the connection member 122 may be a plastic structure integrally formed in one piece. The sleeve portion 121 may bonded with the connection member 122 through hot melting, but the invention is not limited thereto.

Besides, the body 120 and the elastic element 130 may be connected through the connection member 122. Refer to FIG. 1 and FIG. 3. Specifically, the connection member 122 may include a first connection portion 122c. The elastic element 130 has one end fixed on the first connection portion 122c and another end fixed on the second connection portion 113 of the base 110. Therefore, the sleeve portion 121 and the connection member 122 together may move relative to the base 110 through the elastic element 130.

Refer to FIG. 1, FIG. 2 and FIG. 3. The connection member 122 may further include a stopping portion 122t. During the assembly process, the sleeve portion 121 may pass through the opening 111 to be exposed outside the base 110. Since the size L of the stopping portion 122t is larger than that of the opening 111, the connection member 122 will be limited and may not be exposed outside the base 110 from the opening 111. The size L of the stopping portion 122t may be the length along its long axis of the stopping portion 122t or the length along the thickness direction of the stopping portion 122t, and the invention does not have specific restrictions. The size of the opening 111 may refer to the length in the same direction with the size L of the stopping portion 122t. Through the said disposition, when the body 120 is at the second position as indicated in FIG. 2, the stopping portion 122t may lean on the edge of the opening 111 in the first direction D1.

As indicated in FIG. 1 and FIG. 3, the base 110 may include a limiting portion 112. The limiting portion 112 has a movement space 112s. For example, the movement space 112s may be defined by the limiting portion 112 and the remaining portion of the base 110. The connection member 122 is limited to move within the movement space 112s along the first direction D1 and the second direction D2.

In an embodiment, the limiting portion 112 may include one or many rib 112r. As the body 120 moves between the first position and the second position, the rib 112r may lean on the surface 122s of the connection member 122, and make the connection member 122 stably move along the first direction D1 and the second direction D2 without wobbling.

Furthermore, the limiting portion 112 may further include a stopping wall 112w, and the connection member 122 may include a stopper 122w. The stopping wall 112w is perpendicular to the first direction D1 and the second direction D2. When the body 120 is at the first position as indicated in FIG. 1, the connection member 122 may lean on the stopping wall 112w in the second direction D2 through the stopper 122w. If the body 120 is moved from the second position as indicated in FIG. 2 to the first position as indicated in FIG. 1 by the elastic element 130, the stopping wall 112w may avoid the resilience of the body 120 being too large or too quick and becoming damaged.

Thus, the limiting portion 112 may be used as a guide groove for limiting the connection member 122 to stably move within the movement space 112s defined above.

Figure 4:
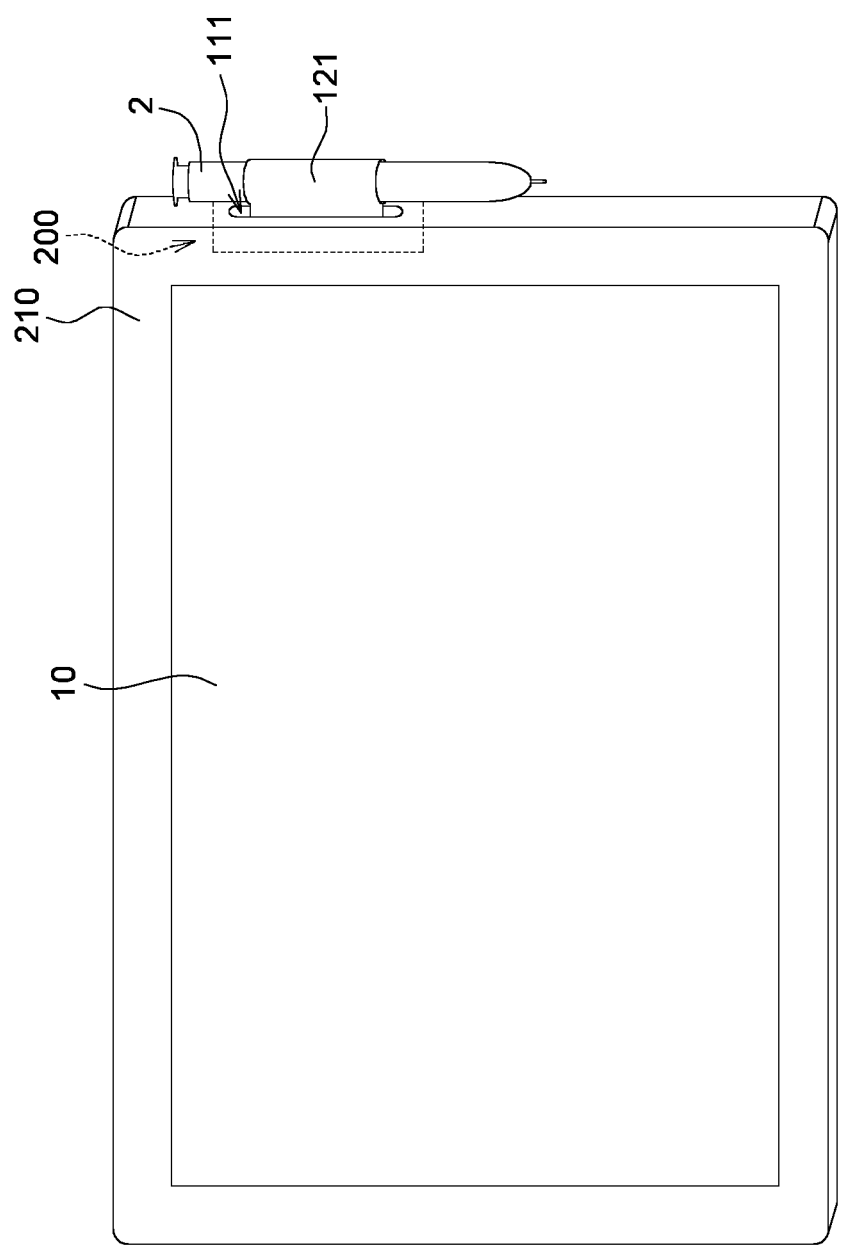
FIG. 4 is a schematic diagram of an electronic device according to an embodiment of the invention.

FIG. 4 is a schematic diagram of an electronic device 1 according to an embodiment of the invention. Refer to FIG. 4, the electronic device 1 includes a casing 210 and a touch panel 10. The casing 210 is configured to cover the touch panel 10. The electronic device 1 includes a tool insertion structure 200 for receiving a stylus pen 2, wherein the tool insertion structure 200 is similar to the tool insertion structure 100 disclosed above.

In the present embodiment, the base of the tool insertion structure 200 may be the casing 210 of the electronic device, but is not limited thereto.

The disposition of FIG. 4 is similar to that of FIG. 1 and FIG. 2, and the designations of FIG. 4 are the same as that of FIG. 1 and FIG. 2. The casing 210 has an opening 111. The elastic element 130 is disposed in the casing 210, and has one end fixed on the inner surface of the casing 210 and another end connected to the body 120. The sleeve portion 121 is movably disposed in the opening 111, and adjusts the size of the insertion space 121s according to the size of the stylus pen 2 varies.

According to the embodiments disclosed above, the tool insertion structure adjusts the size of the insertion space according to the size of the tool to receive different sizes of tools, and is adaptable to various sizes of tools.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A tool insertion structure adaptable to different sizes of tools, the tool insertion structure comprising:
   a base;
   a body comprising a sleeve portion having an insertion space for a tool, wherein the body is movable between a first position and a second position and relative to the base; and
   an elastic element connected to the base and the body to provide a force for moving the body from the second position to the first position;
   wherein the size of the insertion space varies as the body moves between the first position and the second position,
   wherein the base has an opening, and the sleeve portion is movably disposed in the opening, the body further comprises a connection member, the sleeve portion is fixed on the connection member, and the body is connected to the elastic element through the connection member, the connection member comprises a stopping portion whose size is larger than that of the opening.

2. The tool insertion structure according to claim 1, wherein the insertion space is defined as a portion of the sleeve portion outside of the base through the opening.

3. The tool insertion structure according to claim 1, wherein:
when the body is located at the first position, the insertion space has a minimum size;
when the body is located at the second position, the insertion space has a maximum size.

4. The tool insertion structure according to claim 1, wherein the base comprises a limiting portion having a movement space, and the connection member is limited to move within the movement space along a first direction and a second direction opposite to the first direction.

5. The tool insertion structure according to claim 4, wherein when the body is located at the second position, the stopping portion leans on an edge of the opening in the first direction.

6. The tool insertion structure according to claim 4, wherein the limiting portion comprises a rib, which leans on a surface of the connection member as the body moves between the first position and the second position.

7. The tool insertion structure according to claim 4, wherein the limiting portion comprises a stopping wall, and when the body is located at the first position, the connection member leans on the stopping wall in the second direction.

8. An electronic device comprising:
a casing configured to cover a touch panel, wherein the casing has an opening;
a body comprising a sleeve portion movably disposed in the opening, wherein the sleeve portion has an insertion space for a stylus pen, and the body is movable between a first position and a second position and relative to the casing; and
an elastic element connected to the casing and the body to provide a force for moving the body from the second position to the first position;
wherein the size of the insertion space varies as the body moves between the first position and the second position,
wherein the body further comprises a connection member, the sleeve portion is fixed on the connection member, and the body is connected to the elastic element through the connection member, the connection member comprises a stopping portion whose size is larger than that of the opening.

9. The electronic device according to claim 8, wherein the elastic element is disposed in the casing and has one end fixed on an inner surface of the casing and another end connected to the body.

10. The electronic device according to claim 9, wherein the insertion space is defined as a portion of the sleeve portion outside the base through the opening.

11. The electronic device according to claim 10, wherein:
when the body is located at the first position, the insertion space has a minimum size;
when the body is located at the second position, the insertion space has a maximum size.

12. The electronic device according to claim 8, wherein the base comprises a limiting portion having a movement space, and the connection member is limited to move within the movement space along a first direction and a second direction opposite to the first direction.

13. The electronic device according to claim 12, wherein when the body is located at the second position, the stopping portion leans on an edge of the opening in the first direction.

14. The electronic device according to claim 12, wherein the limiting portion comprises a rib, which leans on a surface of the connection member as the body moves between the first position and the second position.

15. The electronic device according to claim 12, wherein the limiting portion comprises a stopping wall, and when the body is located at the first position, the connection member leans on the stopping wall in the second direction.

* * * * *